United States Patent

Squiers

[15] 3,644,075
[45] Feb. 22, 1972

[54] FAIL SAFE ELECTRONIC-CONTROL SYSTEM

[72] Inventor: David J. Squiers, Attleboro Falls, Mass.
[73] Assignee: Texas Instruments Incorporated, Dallas, Tex.
[22] Filed: Sept. 24, 1970
[21] Appl. No.: 75,007

[52] U.S. Cl. ..................................431/66, 236/10, 431/254
[51] Int. Cl. ...........................................................F23n 5/00
[58] Field of Search ..................431/66, 71, 254, 27; 236/10, 236/68; 317/96

[56] References Cited

UNITED STATES PATENTS 3,441,356   4/1969   Walbridge ..............................431/66
3,584,988   6/1971   Hirsbrunner et al......................431/66

*Primary Examiner*—Edward G. Favors
*Attorney*—Harold Levine, Edward J. Connors, Jr., John A. Haug, James P. McAndrews and Gerald B. Epstein

[57] ABSTRACT

A system for maintaining a control device electrically energized only in response to the occurrence of a predetermined condition and for preventing energization of the control device in the absence of the condition. The system includes a first switch device, having a control element, the switch device being serially connected to the control device for controlling energization thereof. A system for producing high-voltage electrical signals for effecting the occurrence of the predetermined condition is provided, and is coupled to the first switch device for effecting energization thereof in response to the production of the high-voltage electrical signals. The system for producing the high-voltage electrical signals includes an actuating element which is rendered operable in response to continued production of the high-voltage electrical signals. A switch control network is coupled to the control element of the first switch device and includes a sensing element in communication with the actuating element. Operation of the sensing element in response to actuation by the actuating element is effective to prevent the application of trigger signals to the first switch device so as to render the same nonconductive thereby preventing energization of the control device, while the occurrence of the predetermined condition renders the actuating element inoperable so as to permit the continued application of trigger signals to the first switch device, thereby maintaining the control device conductive.

19 Claims, 1 Drawing Figure

PATENTED FEB 22 1972
3,644,075
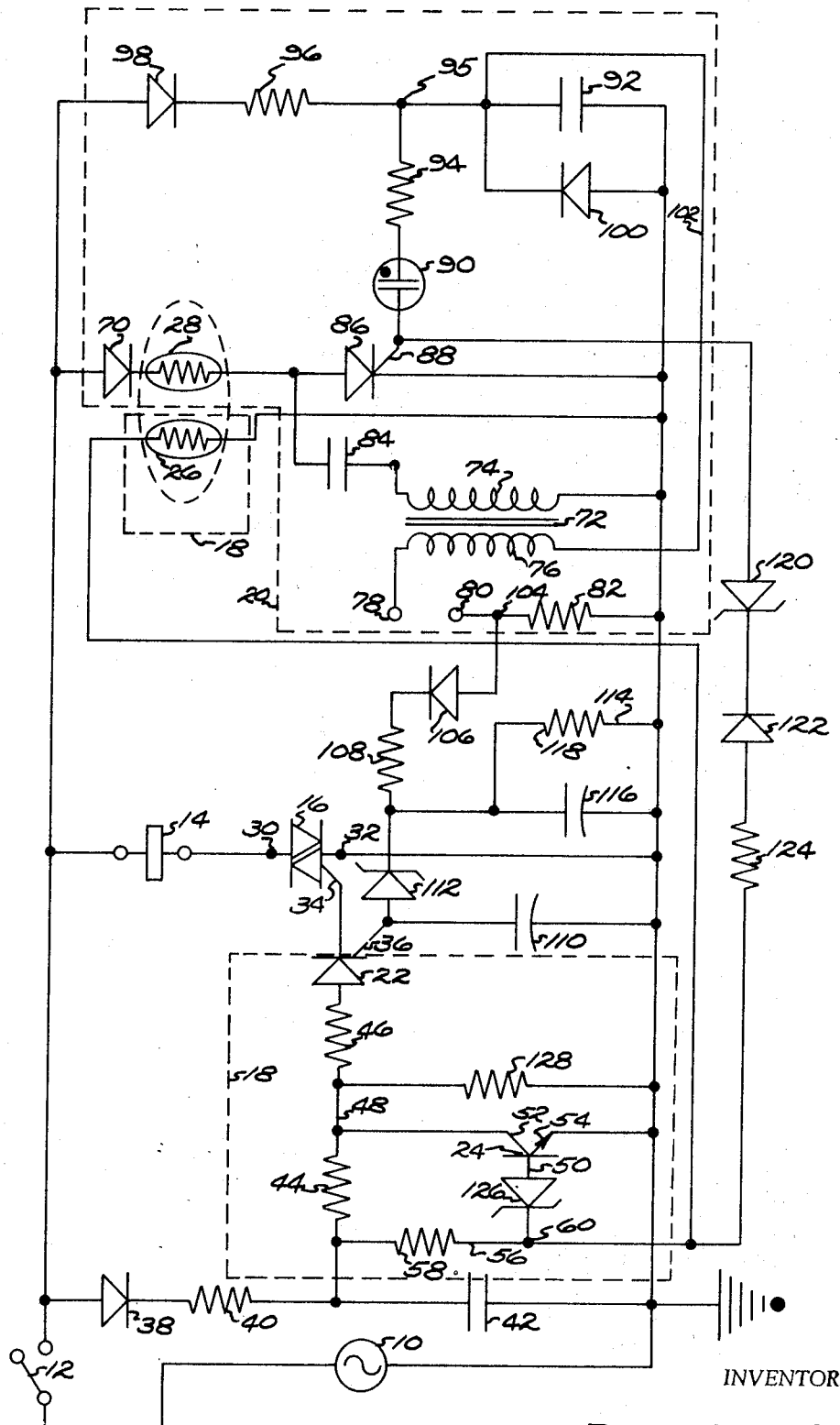
INVENTOR.
BY *David J. Squiers*
*Gerald B. Epstein* Att'y.

FAIL SAFE ELECTRONIC-CONTROL SYSTEM

The present invention relates generally to electronic control systems and more particularly is directed to a fail safe electronic-control system for maintaining a control device energized only in response to a predetermined condition while preventing the continued energization of the control device in the absence of the condition.

In recent years, numerous electronic control systems have been developed for energizing various types of control devices, adapted to control the operation of mechanical devices such as valves and the like, For example, control systems have been developed for selectively energizing solenoids which upon energization, may effect opening or closing of valves utilized in controlling the operation of fluid-flow systems such as gas burners, mechanical-braking systems, etc. However, in view of the criticality of assuring fail safe operation of the control device and hence the valve mechanism, particularly in the aforementioned types of applications, it has become extremely important to assure that the control device will effect operation of the valve so as to prevent further fluid flow, to effect the application of braking, etc., in the presence of the failure of a system component, the failure of proper operation, etc. More particularly, in various types of fluid flow systems, for example, such as those which may be utilized in a home heating or cooling system, it is extremely important to assure a cutoff of the flow of the combustible medium or gas being utilized in the absence of ignition. Thus it is highly desirable to arrange a system which provides for the occurrence of sparking in order to provide an ignition environment while also providing an accompanying flow of the combustible gas by effecting energization of a suitable valve control means, and which also assures deactivation of the control device and hence closure of the valve to prevent further flow of the combustible gas in the absence of ignition in order to avoid a potentially hazardous situation.

Accordingly, it is an object of the present invention to provide an improved electronic-control system for maintaining a control device energized only in response to the occurrence of a predetermined condition.

It is another object of the present invention to provide an improved electronic-control system for controlling the energization of a control device adapted to control the flow of a combustible medium for maintaining the control device energized in response to ignition of the medium, while maintaining the control device deenergized in the absence of ignition of the medium.

It is a further object of the present invention to provide an improved electronic-control system for controlling the operation of a control device adapted to control the flow of a combustible gaseous medium for maintaining the control device energized in response to ignition of the gaseous medium, while maintaining the control device positively deenergized to prevent flow of the combustible medium in response to nonignition of the gaseous medium.

Various additional objects and advantages of the present invention will become readily apparent from the following detailed description and accompanying drawing wherein:

The sole drawing is an electrical schematic circuit diagram of a preferred embodiment of a control system in accordance with the present invention.

Referring generally to the drawing, a control system is illustrated adapted to be energized by a conventional AC power source 10 in response to closure of a suitable switch means 12, which may comprise a thermostat or other appropriate switch mechanism depending upon the use of the control system. A control device 14 is connected to the power source, and is adapted to be energized in response to conduction of a selectively energizable first switch device 16, which is serially connected thereto. Control of the energization of the first switch means 16 is effected by a switch control network 18 coupled thereto, while an ignition network 20, which is adapted to produce high-energy electrical signals, is coupled to the switch control network 18 for initially energizing the switch control network so as to render the first switch device 16 conductive in response to the initiation of the production of the high-energy level electrical signals. In addition, the ignition network is arranged to selectively render the switch control network 18 operative so as to maintain the first switch device 16 in a nonconductive state in response to continued production of the high energy level electrical signals so as to positively deenergize the control device 14.

More particularly, the system illustrated in the drawing is shown in a particular configuration which is adapted for use as a fail safe gas-burner-control system for controlling the operation of a gas valve or the like, although such a system is also readily adaptable for effecting various other types of control functions where fail safe operation is desired, such as in brake-control systems for example. Accordingly, in the illustrated embodiment, the control device 14 preferably comprises a solenoid which is adapted to control the operation of a gas valve or the like (not shown), which is adapted to regulate the flow of a combustible medium so as to permit the flow of gas, while the solenoid 14 is in an energized state and prevent the flow of gas in response to deenergization of the solenoid 14, responsive to energization and deenergization respectively of the first switch device 16. In this regard, energization and deenergization of the first switch device 16 is controlled by the switch control network 18, which includes a second switch device 22 adapted to be rendered conductive so as to effect energization of the first switch device 16 in response to the production of high-energy level electrical signals by the ignition network 20. The control network 18 also includes a shunt switch device 24, which is coupled to the ignition network 20 and is adapted to be selectively rendered conductive in response to the continued production of high-energy level signals by the ignition network 20 without the occurrence of ignition of the gaseous medium. Accordingly, the shunt switch device 24 is adapted to shunt trigger signals from the second switch device 22 so as to cause the first switch device 16 to be rendered nonconductive in the absence of the occurrence of ignition of the gaseous medium. In this connection, conduction of the shunt switch device 24 is controlled by a sensor 26 preferably comprising a heat sensor which is coupled thereto and is in communication with an actuating element 28, preferably comprising a heat generating element, in thermal communication therewith. Heat-generating element 28 is arranged in the ignition network 20 such that continued production of high-energy electrical signals by the ignition network without the occurrence of ignition is effective to cause sufficient heating of the heat-generating element 28 and hence of the heat sensing element 26 to render the shunt switch means 24 conductive so as to cause nonconduction of the first switch device 16, thereby deenergizing the control solenoid 14 to prevent any further flow of gas.

More specifically, the first switch means 16 preferably comprises an AC semiconductor current switch, such as a triac, having a pair of main terminals or anodes 30, 32 and a control element or gate 34. The second switch device 22 preferably comprises a unidirectional switch device, such as a silicon controlled rectifier, having its anode-cathode circuit coupled to the gate 34 of the triac 16 for selectively applying trigger signals thereto in response to conduction of the silicon-controlled rectifier. In this regard, the silicon controlled rectifier 22 includes a gate 36, which is coupled to the ignition circuit 20 in a manner to be explained hereinafter for receiving trigger signals therefrom in response to the initiation of the production of high-energy electrical signals by the ignition circuit so as to render the silicon controlled rectifier 22 conductive to permit the application of trigger signals to the gate of the triac. Upon being rendered conductive in this manner, the silicon controlled rectifier 22 remains conductive and continues to apply trigger current to triac 16 until power is removed from its anode-cathode circuit in response to conduction of the shunt switch 24. Operating power for the triac 16 and hence for the control device 14, as well as for the switch control network 18, is provided by the AC power source 10 upon closure of the switch 12. A half-wave rectifier diode 38 is coupled to the switch control network 18 by a current-limiting resistor 40 serially connected to the diode 38 and a filter capacitor 42. The anode-cathode circuit of the silicon-controlled rectifier 22 is coupled to the junction between the resistor 40 and the capacitor 42 through a pair of current-limiting resistors 44 and 46 which define a voltage divider junction 48 therebetween, the purpose of which will be explained hereinafter.

The shunt switch means 24 is connected in shunt with the anode-cathode circuit of the silicon controlled rectifier 22 and is adapted to shunt current therefrom upon being rendered conductive so as to preclude the further supply of triggering signals to the triac 16 thereby rendering the triac 16 and the control solenoid 14 deenergized. The shunt switch means 24 preferably comprises a transistor which in the illustrated embodiment is an NPN-transistor having a base 50, a collector 52, and an emitter 54. Energizing current for forward biasing the base-emitter junction for rendering the shunt transistor 24 conductive is supplied by a voltage divider configuration 56 including a resistor 58 and the heat sensor 26 which define a voltage divider junction 60 therebetween. The heat sensor 26 preferably comprises a thermistor having a positive temperature coefficient of resistance, and is maintained in thermal communication with the heat generating means 28 for receiving heat therefrom in response to continued current flow through the heat-generating means 28. The thermistor 26 is connected across the base-emitter junction of transistor 24 and thus controls the conduction of the transistor. More particularly, the base 50 of transistor 24 is coupled to the voltage-divider junction 60, and as the resistance of the thermistor 26 increases in response to heating thereof, the voltage level at the voltage-divider junction 60 increases to a level sufficient to forward bias the base-emitter junction. The transistor 24 is then rendered conductive, thereby shunting electrical signals from the anode-cathode circuit of the silicon-controlled rectifier 22 so as to remove triggering signals from the gate 34 of triac 16, rendering the triac nonconductive as the applied AC power passes through its next zero crossover point. In addition, since control of the heating of the thermistor 26 is effected in response to the heat generated by the heat-generating means 28, it may be seen that the operation of the ignition network 20 is effective to cause deenergization of the switch control network 18 and hence prevent further conduction of the triac 16 in response to predetermined electrical conditions within the ignition network.

Referring in detail to the ignition network 20, the heat-generating means 28 preferably comprises a thermistor having a positive temperature coefficient of resistance which is adapted to self-heat in response to current flow therethrough so as to generate heat to cause an increase in the temperature of the thermistor 26 thermally coupled thereto, thereby increasing the resistance of the thermistor 26. As a result, in response to continued current flow through thermistor 28 and consequent heating thereof, the voltage at the junction 60 rises sufficiently to effect conduction of transistor 24. Thus, it may be seen that the ignition network causes deenergization of the control solenoid 14 in response to the continued flow of current in the ignition network.

In the illustrated embodiment, the ignition network is adapted to produce electrical sparks or arcing in order to effect ignition of the gaseous medium, the flow of which is controlled by the control solenoid 14. However, it may be readily appreciated that other phenomena may be effected by the ignition network 20, depending upon the ultimate desired use of the system. For example, the ignition network may be adapted to produce electrical signals for use in controlling a braking system or for use in controlling an electrical motor, etc. Nevertheless, in the illustrated embodiment, the ignition network 20 is adapted to produce high-energy level electrical signals in the form of arcs to permit the ignition of the gaseous medium. The ignition network includes a half-wave rectifier diode 70 which is coupled to the AC power supply 10 for supplying power through the thermistor 28 to a spark-producing means 72, which preferably comprises a high-turns ratio autotransformer 72 having a primary winding 74 and a secondary winding 76. The secondary winding is coupled across a pair of electrodes 78 and 80, which define a spark gap across which the electrical arc is periodically established in response to pulsing of the autotransformer 72. In addition, a resistor 82 is connected to the spark gap electrodes 78, 80 so that the high-energy level electrical signals may be developed thereacross in order to effect triggering of the silicon-controlled rectifier 22. Pulsing of the autotransformer 72 in order to effect the production of the electrical arc is affected by a charging capacitor 84 serially connected to the primary winding 72, as shown, while charging of the capacitor 84 and discharge thereof in order to effect the production of high-energy pulses is controlled by a unidirectional switch means 86, preferably comprising a silicon-controlled rectifier. The silicon-controlled rectifier is connected to the half-wave rectifier diode 70 and the heat-generating thermistor 28 and is connected across the serially connected capacitor 84 and primary winding 72 in order to provide a discharge path for the capacitor 84 through the primary winding 74 upon being rendered conductive. The silicon controlled rectifier 86 has its anode-cathode circuit connected across the serially connected capacitor 84 and primary winding 74 while its gate 88 is coupled through a voltage-divider peak voltage-responsive device 90 to another charging capacitor 92 through a current-limiting protective resistor 94. A current-limiting resistor 96 and the capacitor 92 define a voltage divider having a junction 95, which serves to control conduction of the voltage-responsive device 90 and hence controls triggering of the silicon-controlled rectifier 86. In addition, the junction 95 is coupled to the AC power supply 10 through the resistor 96 and a half-wave rectifier diode 98 which functions to prevent negative current from being applied to the gate 88 of the silicon-controlled rectifier 86. In this connection, the voltage level established at the voltage-divider junction 95 is approximately proportional to the peak voltage which may be developed across capacitor 84, since this voltage level determines the point at which the voltage-responsive device 90, which preferably comprises a neon glow tube, is rendered conductive so as to permit the application of trigger signals to the silicon-controlled rectifier 86, to establish a discharge path for the capacitor 84 and consequent pulsing of the primary winding 74. Thus, when capacitor 84 is charged to a peak voltage, the silicon-controlled rectifier 86 is triggered into conduction. The capacitor 84 then discharges through primary winding 74 and the secondary winding 76 s pulsed to establish a high-voltage signal between the electrodes 78 and 80. As a result, a voltage pulse is also established across resistor 82. In addition, in order to provide a return path to ground for the high-voltage signal, a diode 100 is connected across the capacitor 92, as shown.

It should be noted that prior to the initiation of arcing between the electrodes 78, 80, an extremely high impedance path is present therebetween. However, the impedance of this path is substantially reduced in response to the development of an electrical arc thereacross and accordingly, the impedance across these electrodes and the secondary winding 76, which is serially connected to the electrodes is substantially reduced. A conductor 102 connects the secondary winding 76 and hence couples the variable impedance between electrodes 78, 80, to the voltage-divider junction 95 between resistor 96 and capacitor 92. Accordingly, when this impedance is reduced in response to arcing, a reduced voltage level is established at the junction 95 which reduces the voltage applied to the neon glow tube 90 so as to render the neon glow tube 90 nonconductive, thereby effecting deenergization or turnoff of the silicon controlled rectifier 86. The ignition network 20 is then in a state adapted to permit repetition of the previously described cycle of operation for effecting the establishment of another arc across electrodes 78, 80. However, it should be noted that sparking as well as ignition result in the decreased impedance between the electrodes 78, 80, Thus, if ignition occurs and the impedance established between the electrodes 78, 80 is maintained at a reduced level, the silicon-controlled rectifier 86 is maintained nonconductive due to the reduced voltage level established at junction 95 and the autotransformer 72 is precluded from producing further high-energy electrical signals. Accordingly, a flame-sensing function is provided, since sparking, as well as ignition, results in deenergization of the ignition network 18, although in the event of sparking, another cycle of operation may be initiated while in the event of ignition the ignition network 18 remains deenergized. When ignition occurs, current does not continue to flow through the heat-generating thermistor 28. However, if ignition does not occur, the spark established between the electrodes 78, 80 rapidly dissipates and the neon glow tube 90 is again rendered conductive in response to the voltage established at junction 95 as capacitor 92 is charged. Thus, the silicon-controlled rectifier 86 is again rendered conductive and current flows through the heat-generating thermistor 28 as the cycle is continually repeated. Such current flow results in self-heating of the heat-generating thermistor 28 and effects an increase in the temperature of the heat sensing thermistor 26 to eventually cause the shunt transistor 24 to be rendered conductive, as previously explained.

The establishment of electrical arcing across the electrodes 78, 80 also is adapted to effect triggering of the triac 16 and energization of control solenoid 14 so as to cause gas to begin to flow in order to permit the occurrence of ignition. In this regard, the spark gap electrodes 78, 80 and the resistor 82 define a voltage-divider junction 104 therebetween, which is coupled to the gate 36 of the silicon-controlled rectifier 22 so as to control triggering of the silicon-controlled rectifier 22. Since the impedance between the electrodes 78, 80 is varied in response to arcing, the voltage at the junction 104 is similarly varied. In this connection, as the impedance between the electrodes 78, 80 is reduced as a result of arcing the voltage developed across the resistor 82 and hence the voltage at junction 104 increases so as to affect the application of trigger signals to the gate 36. The junction 104 is connected to the gate 36 through a protective diode 106, which precludes the application of negative pulses to the gate 36, through a filter network, including a resistor 108 and a capacitor 110 for controlling the firing level of the silicon-controlled rectifier, and also through a voltage-responsive device 112, such as a zener diode, which precludes the application of trigger signals to the gate 36 until a voltage level is established at the junction 104. When this voltage level is established, the zener diode 112 is rendered conductive, and effects the application of a trigger current to the gate 36, rendering the silicon-controlled rectifier 22 conductive. Furthermore, as an additional safety feature to prevent false arc sensing, which may occur due to dirt particles bridging the gap between electrodes 78, 80 and reducing the impedance thereof, a time delay network 114 including a capacitor 116 and a bleeder resistor 118 is connected across the gate 36 of the silicon-controlled rectifier 22. Time delay network 114 provides a predetermined time delay between the initiation of sparking between the electrodes 78, 80 and the consequent voltage increase across capacitor 116 and the application of trigger signals to the gate 36 of the silicon-controlled rectifier 22. Accordingly, several sparks must be established across the electrodes 78, 80 prior to the initiation of conduction of the silicon-controlled rectifier 22. Such a highly is high advantageous in view of the flame-sensing function utilized whereby a reduction in the impedance across electrodes 78, 80 renders silicon-controlled rectifier 86 nonconductive so that heating of the thermistor 28 to cause energization of shunt transistor 24 is prevented. Thus, a malfunction of the spark gap, such as may be caused due to the presence of dirt particles, or the like, which could bridge the electrodes and falsely provide an indication of the establishment of ignition, as well as triggering the triac 16 and energizing solenoid 14 in the absence of ignition, is prevented by virtue of the time delay prior to the initiation of triggering of the silicon-controlled rectifier 22, which requires the production of several high voltage sparks in order to effect operation of time delay network 114 so as to cause triggering of the silicon-controlled rectifier 22.

In order to assure a positive halt in sparking in the absence of ignition, as well as to assure positive deenergization of the triac 16 in response to heating of heat-generating thermistor 28, the gate 88 of silicon-controlled rectifier 86 in the ignition circuit is coupled to the voltage-divider junction 60 between resistor 58 and heat-sensitve thermistor 26 in the switch control circuit 18. In this regard, the gate 88 of silicon-controlled rectifier 86 is coupled to the voltage-divider junction 60 of the voltage divider 56, which is connected across the shunt switch transistor 24. This connection is made through a voltage-responsive means 120 having a first predetermined breakover point at which it is rendered conductive, through a blocking diode 122 which precludes the application of negative pulses to the gate 88 of silicon-controlled rectifier 86, and through a voltage-limiting resistor 124. In addition, as shown, the voltage-divider junction 60 is coupled to the base 50 of shunt switch transistor 24 through another voltage-responsive device 126 having a second predetermined breakover point at which is rendered conductive, which is in excess of the first predetermined breakover point of the voltage-responsive device 120. Preferably, the voltage-responsive devices 120, and 126 comprise zener diodes, which are normally reversed biased and nonconductive until their respective breakover voltages are exceeded at which point they become conductive and supply a substantially constant voltage level.

As previously explained, the voltage level established at the voltage-divider junction 60 is dependent upon the heat supplied to thermistor 26, which controls its resistance, while this voltage level also controls the triggering or energization of the shunt switch transistor 24. Furthermore, the voltage level established at junction 60 also controls the conduction of zener diode 120. Thus, as the voltage level at junction 60 increases in response to heating of the heat-sensitive thermistor 26 due to continued pulsing of the ignition network 20, in the manner previously explained, the zener diode 120 which has a breakover point below that of the zener diode 126 is rendered conductive. When zener diode 120 is rendered conductive, an increased current level is established at the gate 88 of silicon-controlled rectifier 86, since the gate 88 is directly connected to the zener diode 120. Consequently the silicon controlled rectifier 86 is gated into full-on conduction which results in shunting the capacitor 84 and primary winding 74 across which the silicon-controlled rectifier is connected and thus prevents the production of further sparks across the electrodes 78, 80. Furthermore, as a result of the full-on condition of the silicon-controlled rectifier 86, an increased flow of current through the heat-generating thermistor 28 is initiated which in turn drives the heat-sensing thermistor 26 to a higher temperature increasing its resistance level still further. As a result, the voltage at the voltage-divider junction 60 increases sufficiently to effect conduction of zener diode 126, which is coupled between junction 60 and the base 50 of transistor 24. In addition, it may be noted that since resistor 124 is in series with the zener diode 120 the voltage established at the voltage-divider junction 60 across the heat-sensing thermistor 26 is permitted to rise to a higher level than the voltage drop across the diode 122, the zener diode 120, and the gate to cathode junction of silicon-controlled rectifier 86 so that zener diode 126 may be rendered conductive subsequent to conduction of zener diode 120. Once zener diode 126 has been rendered conductive, a signal is applied across the base-emitter junction of transistor 24 sufficient to drive this transistor into saturation so that a conductive shunt path is provided across its collector-emitter circuit for the signals being supplied by the half-wave rectifier diode 38, thereby removing the power being supplied to the silicon-controlled rectifier 22, which effects the removal of trigger signals from the gate 34 of triac 16, rendering the triac nonconductive as the applied AC power passes through its next zero crossover point. In addition, a protective resistor 128 is preferably connected across the collector-emitter circuit of the transistor 24 to maintain the voltage thereacross at a safe level. To provide further protection for the transistor 24, its collector-emitter circuit is coupled to the voltage-divider junction 48 defined between resistors 44, 46, so that the transistor 24 may safely shunt the power supply signal away from the silicon-controlled rectifier 22. Once transistor 24 has been rendered conductive, it remains in that condition, and current is continually shunted from the silicon-controlled rectifier 22 so that the triac 16 remains nonconductive. The system remains in this state and the control solenoid 14 is maintained in a deenergized state. Accordingly, the system is effectively locked out in that the control solenoid 14 cannot be energized until the switch 12 is opened and then reclosed in order to recycle the system.

To briefly summarize the operation of the system, upon initial closure of the switch 12, half-wave AC rectified power is supplied through the diode 38 to the switch control circuit 18 and is similarly supplied to the ignition circuit 20 through the diode 70. The triac 16 remains nonconductive until the silicon-controlled rectifier 22 coupled to its gate is energized to permit the application of trigger signals thereto. The power supplied by the diode 70 effects charging of capacitor 84 while power is similarly supplied through the half-wave rectifier diode 98 and resistor 96 to effect charging of the capacitor 92. As charge builds up across the capacitor 92 to sufficient level, the neon glow tube 90 coupled to the gate 88 of silicon-controlled rectifier 86 is rendered conductive and hence triggering of the silicon-controlled rectifier 86 is effected to permit the capacitor 84 to discharge through the primary winding of autotransformer 72. As a result, a relatively high-voltage level is developed across the secondary winding 76 of the autotransformer and sparking occurs across the spark gap electrodes 78, 80 and an increased voltage level is established across capacitor 116 in view of the reduction in the impedance across the spark gap accompanying the arcing. After several repetitive sparks have been provided, the time delay network 114 charges so as to apply a sufficient voltage level to the zener diode 112 coupled to the gate 36 of the silicon-controlled rectifier 22 to render the silicon-controlled rectifier 22 conductive causing it to apply trigger signals to the gate 34 of triac 16, rendering triac 16 conductive. As a result, the control solenoid 14 is energized and gas is caused to flow in order to permit ignition as a result of the sparks provided across the spark gap electrodes 78, 80. In the event of ignition, the impedance across the electrodes 78, 80 remains at a substantially reduced level and the voltage developed across the primary winding 74 is substantially reduced. The conductor 102, which connects the secondary winding 76 to the junction 95 between resistor 96 and capacitor 92, causes the voltage level at this junction to be similarly reduced to a point which is insufficient to maintain conduction of the neon glow tube. Consequently, trigger signals are no longer applied to the silcon-controlled rectifier 86 and the ignition circuit is rendered nonconductive. However, once the silicon-controlled rectifier 22 has been energized, it remains in an energized state and continues to apply trigger signals to the triac 16 which remains conductive so that the control solenoid remains energized and gas continues to flow to maintain ignition until the switch 12 is opened. However, in the event ignition does not occur, high energy electrical pulses continue to be provided by the autotransformer 72 and current continues to flow through the ignition network and hence through the heat-generating thermistor 28 which begins to self-heat. As a result, the heat-sensing thermistor 26 which is thermally coupled to the thermistor 28 is heated and the voltage level at the junction 60 increases substantially. As this voltage level increases, the zener diode 120 coupled thereto is rendered conductive which drives the silicon-controlled rectifier 86 into hard conduction further increasing the current flow through heat-generating thermistor 28 and further increasing heating of the heat-sensing thermistor 26. As the voltage at the junction 60 increases further in response to additional heating of the heat-sensing thermistor 26, the zener diode 126 is rendered conductive and drives the shunt switch transistor 24 into conduction, which effects shunting of electrical power from the anode-cathode circuit of silicon-controlled rectifier 22 through the emitter-collector circuit of transistor 24, thereby effecting deenergization or non-conduction of the triac 16 as the applied AC signal passes through its next zero crossover point. In response to nonconduction of triac 16, the solenoid control 14 is deenergized and gas glow is cut off. Furthermore, since the transistor 24 remains in saturation, trigger signals cannot be reapplied to the triac 16 until the switch 12 is opened and the circuit is recycled by reclosing the switch 12 in order to effect the initiation of another cycle of operation. Accordingly, a positive lockout is provided in the event of nonignition.

Thus, a unique control system has been provided for controlling energization and deenergization of a control device, such as solenoid, adapted to regulate the flow of a combustible medium so as to effect continued energization of the control device and thus continued gas flow in the presence of ignition, while providing a positive lockout feature to prevent continued energization of the control device and hence prevent gas flow in the absence of ignition. In addition, the control system provides for a predetermined time delay prior to the initiation of ignition in order to prevent false arc sensing from energizing the control device.

Various changes and modifications in the above-described embodiment will be readily apparent to one skilled in the art and such changes and modifications are deemed to be within the spirit and scope of the present invention as set forth in the appended claims.

1. A system for maintaining a control device electrically energized only in response to the occurrence of a predetermined condition and for preventing energization thereof in the absence of the predetermined condition comprising a first selectively energizable switch means having a control element for controlling the conduction thereof, said first switch means being serially connected to the control device for controlling the energization thereof, switch control means connected to said control element of said first switch means for selectively supplying trigger signals thereto to control the conduction of said first switch means, said switch control means including a first sensor having an electrical property which varies in response to the nonoccurrence of the predetermined condition for affecting the operation of said switch control means, means for producing a high-voltage electrical signal adapted to effect the predetermined occurrence and for energizing the switch control means so as to render said first switch means conductive, thereby energizing the control device, a second sensor electrically coupled to said means for producing the high-voltage signal and in communication with said first sensor, said second sensor being adapted to affect the electrical property of the first sensor in response to the nonoccurrence of the predetermined condition so as to prevent the switch control means from supplying trigger signals, to thereby render said first switch means nonconductive, and a second selectively energizable switch means coupled to said first sensor for effecting shunting of trigger signals from said first switch means, in response to the nonoccurrence of the predetermined condition.

2. A system in accordance with claim 1 wherein said switch control means includes a unidirectional current switch coupled between a source of electrical power and the control terminal of said first switch means, said unidirectional current switch having a control element coupled to said means for producing the high-voltage electrical signal to permit said unidirectional switch means to be rendered conductive at a predetermined time subsequent to the production of the high-voltage signal.

3. A system in accordance with claim 2 wherein said second selectively energizable switch means includes in control element for controlling the conduction thereof coupled to said first sensor, said second selectively energizable switch means being connected in shunt with said unidirectional switch means for maintaining said unidirectional switch means for maintaining said unidirectional switch means nonconductive by shunting electrical power therefrom upon energization of said second selectively energizable switch means in response to variations in the electrical property of said first sensor.

4. A system in accordance with claim 3 wherein said first and second second sensor are in thermal communication with each other, said second sensor comprises a resistor adapted to produce heat in response to the flow of electrical current therethrough, and said first sensor comprises a resistor the resistance of which increases in response to an increase in sensed temperature.

5. A system in accordance with claim 4 wherein said means for producing a high-voltage signal includes a transformer having a primary winding and a high-turns ratio secondary winding, a pulse-producing network connected across said primary winding and coupled to said second sensor, and a spark gap coupled to said secondary winding for producing high-voltage sparks in response to pulsing of said primary winding, said spark gap being coupled to said pulse-producing network for effecting deenergization thereof and a halt in the production of the high-voltage sparks in response to a reduction in the resistance across said spark gap as an indication of the occurrence of the predetermined condition, said spark gap also being coupled to said control element of said unidirectional switch means for effecting conduction thereof in response to the production of the high-voltage sparks.

6. A system in accordance with claim 5 wherein said second sensor is adapted to self-heat in response to current flow therethrough as a result of continued pulsing of said primary winding to effect an increase in the resistance of said first sensor sufficient to effect energization of said second selectively energizable switch means, thereby causing the shunting of electrical power from said unidirectional switch means and rendering said first switch means nonconductive, whereby the control device is maintained deenergized.

7. A system in accordance with claim 6 wherein said first switch means comprises a triac having its anodes serially connected with the control device, said unidirectional switch means comprises a silicon-controlled rectifier having its gate coupled to said spark gap, and said second switch means comprises a transistor having its base coupled to said first sensor, and having its collector-emitter circuit connected in shunt with the anode-cathode circuit of said silicon-controlled rectifier.

8. A system for controlling the energization of a control device adapted to regulate the flow of a combustible medium for maintaining the control device energized in response to ignition of the medium and maintaining the control device deenergized in the absence of ignition of the medium, comprising a first selectively energizable switch means having a control element for controlling the conduction thereof and having a pair of main terminals serially connected to the control device for maintaining the control device energized in response to conduction between said main terminals and deenergized in response to nonconduction between the main terminals, a switch control network including a second selectively energizable switch means coupled to said control element of rendering said first switch means conductive in response to the initiation of ignition, said switch control network further including a selectively actuable sensing means coupled to said second switch means and responsive to nonignition for causing deenergization of said second switch means to maintain said first switch means nonconductive, an ignition network adapted to produce high-energy electrical signals for effecting ignition coupled to said switch control network for respectively energizing said second switch means responsive to initiation of the production of the high-energy electrical signals and for actuating said sensing means responsive to continued production of the high-energy electrical signals in the absence of ignition to effect deenergization of said second switch means.

9. A system in accordance with claim 8 where in said second switch means includes a control element connected to said ignition network for receiving trigger signals therefrom at a predetermined time interval subsequent to the production of the high-energy electrical signals.

10. A system in a accordance with claim 9 wherein said switch control network includes a third selectively energizable switch means coupled to said selectively actuatable sensing means and arranged to shunt operating power from said second switch means to maintain said second switch means nonconductive in response to actuation of said selectively actuatable sensing means, thereby maintaining said firs switch means nonconductive in the absence of ignition.

11. A system in accordance with claim 10 wherein said ignition network includes an activating element in communication with said selectively actuatable sensing means, said activating element being adapted to effect actuation of said sensing means in response to continued production of the high-energy electrical signals.

12. A system in accordance with claim 11 wherein said activating element comprises a thermistor adapted to self-heat and generate heat in response to continued current flow therethrough, said selectively actuatable sensing means comprises a thermistor having a resistance which increases in response to sensed heat, and said activating element and said selectively actuatable sensing means are in thermal communication.

13. A system in accordance with claim 12 wherein said ignition network includes a forth switch means connected with said activating element, said forth switch means having a control element, a selectively energizable spark-producing means coupled to said activating element and to said fourth switch means, said spark-producing means including a spark gap adapted to produce the high-energy electrical signals subsequent to conduction of said fourth switch means, and means for coupling said spark-producing means to said control element for rendering said fourth switch means nonconductive subsequent to ignition across said spark gap so as to preclude further current flow through said actuating element.

14. A system in accordance with claim 13 wherein a voltage-responsive means is coupled between said control element of said fourth switch means and said selectively actuatable sensing means, said voltage responsive means being adapted to be rendered conductive in response to a predetermined increase in the resistance of said sensing means so as to increase the level of conduction of said fourth switch means and the current flow through said activating element, thereby increasing the resistance of said sensing means to render said third switch means conductive for shunting operating power from said second switch means.

15. A system in accordance with claim 14 wherein said spark-producing means includes a charge storage network and a transformer, said transformer having a primary winding coupled to said charge storage network for receiving periodic pulses and having a secondary winding coupled to said spark gap.

16. A system in accordance with claim 15 wherein said spark gap is coupled to said second switch means for supplying trigger signals thereto in response to conduction across said spark gap.

17 A system for controlling the operation of a control device adapted to control the flow of a combustible fluid for maintaining the control device energized in response to ignition of the fluid and maintaining the control device deenergized in response to the nonignition of the fluid comprising a first semiconductor switch having a gate and having a pair of main terminals serially connected to the control device for supplying operating power to the control device in response to conduction of said first semiconductor switch and for preventing the supply of operating power to the control device in response to nonconduction of said first semiconductor switch, a second semiconductor switch having a gate and having a pair of main terminals serially connected to said gate of said first semiconductor switch, a third semiconductor switch having a control element and having a pair of main terminals connected in shunt with said main terminals of said second semiconductor switch for shunting operating power from said second semiconductor switch in response to conduction of said third semiconductor switch, a heat sensor coupled to the control element of said third semiconductor switch having a resistance which increases in response to heat so as to control the conduction of said third semiconductor switch, and an ignition network including a spark gap across which high-voltage sparks are developed, a fourth semiconductor switch having a gate terminal and a pair of main terminals, means for rendering said fourth semiconductor switch conductive, means for rendering said fourth semiconductor switch nonconductive, means for coupling a portion of the voltage developed, said spark gap to said gate of said first semiconductor switch for initially rendering said first semiconductor switch conductive in response to sparking, and heat-generating means coupled to said main terminals of said fourth semiconductor device and in thermal communication with said heat sensor for heating said heat sensor in response to continued current flow through said heat-generating means accompanying continued conduction of said fourth semiconductor switch.

18. S system in accordance with claim 17 wherein said heat-generating means said heat sensor each comprise a thermistor having a positive temperature coefficient of resistance and said first semiconductor switch comprises a triac.

19. A system in accordance with claim 18 wherein said second semiconductor switch and said fourth semiconductor switch each comprises a silicon-controlled rectifier and said third semiconductor switch comprises a transistor having its base coupled to said heat sensor and having its collector-emitter circuit connected in shunt with the anode-cathode circuit of said second silicon-controlled rectifier.

* * * * *